United States Patent
Vincelette et al.

(10) Patent No.: US 10,843,290 B2
(45) Date of Patent: Nov. 24, 2020

(54) ACOUSTICALLY ENHANCED OPTICAL CABLES

(71) Applicant: Weatherford Technology Holdings, LLC, Houston, TX (US)

(72) Inventors: Andre R. Vincelette, Deux-Montagnes (CA); Christopher S. Baldwin, Laurel, MD (US); Paul Lefebvre, Laval (CA); Hongbo Li, North Potomac, MD (US); Domino Taverner, Delray Beach, FL (US); James R. Dunphy, Jamestown, RI (US)

(73) Assignee: Weatherford Technology Holdings, LLC, Houston, TX (US)

( * ) Notice: Subject to any disclaimer, the term of this patent is extended or adjusted under 35 U.S.C. 154(b) by 835 days.

(21) Appl. No.: 14/994,628

(22) Filed: Jan. 13, 2016

(65) Prior Publication Data
US 2016/0209584 A1 Jul. 21, 2016

Related U.S. Application Data

(60) Provisional application No. 62/104,934, filed on Jan. 19, 2015.

(51) Int. Cl.
*B23K 20/10* (2006.01)
*G02B 6/44* (2006.01)
(Continued)

(52) U.S. Cl.
CPC ............ *B23K 20/10* (2013.01); *E21B 47/135* (2020.05); *G01H 9/004* (2013.01); *G02B 6/4413* (2013.01); *G02B 6/4415* (2013.01)

(58) Field of Classification Search
CPC .... B23K 20/10; G02B 6/4413; G02B 6/4415; E21B 47/135; G01H 9/004
See application file for complete search history.

(56) References Cited

U.S. PATENT DOCUMENTS

| | | | |
|---|---|---|---|
| 4,979,798 A | 12/1990 | Lagakos et al. | |
| 5,194,847 A | 3/1993 | Taylor et al. | |

(Continued)

FOREIGN PATENT DOCUMENTS

| | | |
|---|---|---|
| CA | 2849317 C | 10/2016 |
| EP | 0540988 A1 | 5/1993 |

(Continued)

OTHER PUBLICATIONS

Silixa Ltd., Method and System for Determining Downhole Optical Fiber Orientation and/or Location, Feb. 4, 2015, UK Intellectual Property Office.*

(Continued)

*Primary Examiner* — Ryan A Lepisto
*Assistant Examiner* — Erin D Chiem
(74) *Attorney, Agent, or Firm* — Patterson + Sheridan, LLP (57) ABSTRACT

Methods and apparatus to control the acoustic properties of optical cables used as in-well oil and gas probes for acoustic monitoring, such as distributed acoustic sensing (DAS). One example aspect provides a solid path for the acoustic wave to propagate from an outside armor layer of the cable to the sensing optical waveguide embedded therein. Another example aspect offers ways to spatially dispose the optical sensing elements to create response delays indicative of the propagation speed and/or direction of an acoustic wave. Yet another example aspect provides ways to utilize additional spectral interrogation to increase ultimate spatial resolution. Yet another example aspect provides ways to locally vary the acoustic properties along the length of the cable.

17 Claims, 7 Drawing Sheets

(51) Int. Cl.
*E21B 47/135* (2012.01)
*G01H 9/00* (2006.01)

(56) References Cited

U.S. PATENT DOCUMENTS

| | | | |
|---|---|---|---|
| 5,510,549 A | 4/1996 | Ashjian et al. | |
| 5,621,842 A | 4/1997 | Keller | |
| 5,872,876 A * | 2/1999 | Kluth | G01H 9/004 385/12 |
| 5,987,197 A | 11/1999 | Kersey | |
| 6,185,352 B1 | 2/2001 | Hurley | |
| 6,208,776 B1 | 3/2001 | Prohaska et al. | |
| 6,295,401 B1 | 9/2001 | Rutterman et al. | |
| 6,559,437 B1 * | 5/2003 | Pope, Jr. | H01B 7/328 250/227.14 |
| 6,782,150 B2 * | 8/2004 | Davis | E21B 47/102 385/12 |
| 7,304,725 B2 | 12/2007 | Hartog et al. | |
| 7,412,118 B1 | 8/2008 | Shaibani et al. | |
| 7,595,865 B2 | 9/2009 | Hartog et al. | |
| 7,769,252 B2 | 8/2010 | Taverner et al. | |
| 7,946,341 B2 | 5/2011 | Hartog et al. | |
| 7,946,350 B2 | 5/2011 | Greenaway | |
| 8,520,197 B2 | 8/2013 | Handerek | |
| 2003/0099447 A1 | 5/2003 | Stingl | |
| 2005/0100414 A1 * | 5/2005 | Salama | E21B 17/01 405/224.2 |
| 2005/0180677 A1 * | 8/2005 | Andrews | G01M 11/085 385/13 |
| 2010/0222487 A1 | 9/2010 | Nishi et al. | |
| 2011/0320147 A1 * | 12/2011 | Brady | G01H 9/004 702/66 |
| 2012/0111104 A1 * | 5/2012 | Taverner | G01H 9/004 73/152.16 |
| 2012/0227504 A1 * | 9/2012 | Goldner | G01H 9/00 73/655 |
| 2012/0255362 A1 | 10/2012 | Den Boer et al. | |
| 2013/0028555 A1 * | 1/2013 | Dailey | B32B 7/02 385/12 |
| 2013/0100768 A1 | 4/2013 | Lopez et al. | |
| 2013/0211726 A1 | 8/2013 | Mestayer et al. | |
| 2013/0230629 A1 | 9/2013 | Hathuc et al. | |
| 2013/0291642 A1 | 11/2013 | Crickmore et al. | |
| 2013/0291643 A1 | 11/2013 | Lumens | |
| 2013/0308913 A1 | 11/2013 | Tanigawa et al. | |
| 2013/0319121 A1 | 12/2013 | Hill et al. | |
| 2014/0199017 A1 | 7/2014 | Den Boer et al. | |
| 2014/0262594 A1 | 9/2014 | Lee | |
| 2016/0349403 A1 * | 12/2016 | Farhadiroushan | G01V 11/005 |

FOREIGN PATENT DOCUMENTS

| | | | | |
|---|---|---|---|---|
| JP | H11258472 A | | 9/1999 | |
| WO | 2007/077419 A1 | | 7/2007 | |
| WO | WO 2013030555 A2 * | | 3/2013 | E21B 43/119 |
| WO | 2014064460 A2 | | 5/2014 | |
| WO | 2014159702 A2 | | 10/2014 | |
| WO | 2014/201313 A1 | | 12/2014 | |

OTHER PUBLICATIONS

Unger, "Winding Tolerances in Helix Waveguide," Bell System Technical Journal, vol. 39, 1960, pp. 627-643.*
International Search Report and Written Opinion dated Jul. 11, 2016, corresponding to Application No. PCT/US2016/013328.
Great Britain Search Report dated Jun. 12, 2020, corresponding to Application No. GB1711289.7.
Canadian Office Action dated Sep. 14, 2020, corresponding to Application No. 2,972,607.

* cited by examiner

ACOUSTICALLY ENHANCED OPTICAL CABLES

CLAIM OF PRIORITY UNDER 35 U.S.C. § 119

This application claims benefit of U.S. Provisional Patent Application Ser. No. 62/104,934, filed Jan. 19, 2015 and entitled "ACOUSTICALLY ENHANCED OPTICAL CABLES," which is herein incorporated by reference in its entirety.

BACKGROUND

Field of the Disclosure

Aspects of the present disclosure generally relate to acoustic sensing using optical waveguides and, more specifically, to methods and apparatus to control the acoustic properties of an optical cable used as an acoustic probe.

Relevant Background

In the last few decades, the deployment of optical fibers has exploded, not only for the pure transmission of information, but also for measuring various physical parameters. By its intrinsic nature, the optical fiber can serve as a distributed sensor through its scattering characteristics. For example, Rayleigh scattering has been used for monitoring optical power along the fiber path, Raman scattering has been used to measure the temperature profile along the fiber, and Brillouin scattering has been used to measure the fiber strain profile. In addition, an optical fiber's local optical properties can be modified to reflect signals dependent on local physical parameters. For example, fiber Bragg gratings (FBGs) reflect optical signals centered at varying wavelengths according to the local fiber temperature and strain.

In the last couple of decades, optical fibers have been increasingly used to monitor oil and gas wells. The small diameter and long reach of fibers are ideal for insertion in such wells and do not obstruct the wells significantly to alter their primary function as fluid conduits. In addition, since optical fibers are made of glass, the fibers remain inert even in the high temperature and pressure conditions downhole, which are too harsh for most materials. One drawback of optical fibers is their fragility against mechanical scratching and crushing; consequently, optical fibers are typically embedded in a mechanically protective layer to form an optical fiber cable. Tubulars composed of low corrosive alloys are the mechanical protective layer generally used in oil and gas wells, for transmitting optical signals between the surface and individual point optical sensors downhole.

One oil and gas application of interest is acoustic/seismic in-well monitoring since such monitoring enables measuring the density (through speed of sound and acoustic attenuation) of the medium traversed by the sound waves and captured by the acoustic sensors. One of the parameters that can be measured on an optical fiber is its axial strain. Since the impact of sound waves on the fiber creates small axial strains, these strains can be monitored by measuring the dynamic variation in time of the phase of a coherent optical signal coming from the same location along the optical fiber. Small variations in optical path length, or axial strain, may result in a proportional shift in the phase of the received signal. The initial acoustic fiber optic sensors used in oil and gas wells were point sensors composed of an acoustic fiber cavity created between two low reflective structures embedded in the fiber (e.g., two fiber Bragg gratings (FBGs)), where the fiber was wrapped around an acoustically swell-able mandrel, thus constituting a geophone. In this case, the optical fiber cable was conventionally only used to transmit optical signals.

In the last few years with the advances in optical components, a technology known as distributed acoustic sensing (DAS) has been emerging, which is based on coherent Rayleigh scattering back reflections. This technology is based on sending a coherent, pulse of laser light down the fiber, measuring sequentially the phase of Rayleigh back-scattering at high frequency, and associating consecutive fiber segments to each signal. By monitoring the phase variations for each fiber segment, the fiber is effectively divided into consecutive acoustic sensors. With this approach, the optical fiber cable is not only used for signal transmission, but becomes a distributed acoustic sensor; thus, the optical cable's acoustic properties directly influence the monitoring system's performance.

Fiber-optic-based distributed acoustic sensors have been around for several years, including the use of coherent Rayleigh scattering as described in U.S. Pat. No. 5,194,847 to Taylor et al., for example. Initial in-well deployments of DAS used already deployed or commercially available standard optical fiber cables designed for signal transmission, rather than for acoustic capitation. This situation resulted in significant sound wave attenuation, axial dissipation, and frequency distortion through the various cable layers protecting the sensitive optical fiber(s) from the environment containing the acoustic sources of interest. In addition, the optical fiber(s) already deployed in these cables, or in standard downhole cables, were also optimized for purposes other than acoustic detection.

One approach suggested was to design fiber optic cables based on a continuous geophone consisting of wrapping the optical fiber around an embedded longitudinal, acoustically reacting, swell-able mandrel, configured to amplify the axial fiber strain exerted on the fiber by the sound waves (e.g., as described in U.S. Patent Application Publication No. 2011/0320147 to Brady et al.; U.S. Pat. No. 9,217,801 to Goldner et al.; and WO 2014/064460 to Crickmore et al.), filled or not with acoustically absorbing material to avoid dispersion. U.S. Pat. No. 9,080,949 to Mestayer et al. adds using two optical fibers with different wrapping angles to differentiate between axially and radially induced strain. This patent application also describes covering the cable with an elastomer, swelled after insertion to fill the interstice between the cable and the wellbore's wall, thereby enhancing acoustic communication with the ground, but blocking the well. U.S. Patent Application Publication No. 2012/0222487 to Hill et al. describes using an optical fiber off-centered with respect to the cable's central axis with gel to maintain the fiber in place or optical fiber with a non iso-radial stiffness to amplify the fiber movement initiated by sound waves reaching the outside of the cable. U.S. Patent Application Publication No. 2013/0291643 to Lumens describes using parallel fiber, joined by a U-junction at the distal ends, with two different envelopes or coatings having a different Poisson's ratio (thus a radial/axial acoustic sensitivities ratio) to deduce the directionality of the sound waves' propagation with respect to the radial and axial axes. U.S. Pat. No. 9,140,815 to Lopez et al. extends that concept to a multitude of parallel optical fibers joined together serially by U-junctions, which may eradicate the differential coatings of U.S. 2013/0291643 to Lumens et al. by measuring the delay in acoustic signal reception between the parallel adjacent segments. U.S. Pat. No. 9,109,944 to Den Boer et al. describes using the two joint parallel fibers with non-aligned channel spacing to increase the spatial resolution rather than differential axis sensitivities to obtain directionality. U.S. Pat. No. 9,091,589 to Den Boer et al. describes using a centered internal membrane all along the cable to split the cable in two, fixing the optical fiber to the internal membrane so that the fiber is off-centered, and obtaining different fiber movement resistance normal or perpendicular to the membrane. This effect can be increased by adding weight in the center part of the membrane. U.S. Patent Application Publication No. 2013/0291642 to Crickmore et al. describes using an anisotropic micro-structured optical fiber to obtain non-radially uniform acoustic sensitivities in the optical fiber itself.

Commonly owned U.S. Patent Application Publication No. 2012/0111104 to Taverner et al. describes inter alia different methods to increase optical cable acoustic sensitivity, including using dopants in the core of the fiber to enhance the Rayleigh backscattering, a two layer metallic armor on the fiber with the outer layer having perforations to let the sound waves pass, and a cable with different acoustic sensitivity along its length, including using a resonating mechanical structure as a transducing element to amplify specific frequencies. U.S. Patent Application Publication No. 2013/0319121 to Hill et al. and U.S. Patent Application Publication No. 2014/0262594 to Lee also describe resonator designs included in the fiber optic cable to amplify specific frequencies. U.S. Patent Application Publication No. 2013/0230629 to Lee describes a method of assembling a cable containing various optical fibers with different acoustic properties disposed in a revolver barrel type, such that any fiber can be aligned to any fiber in the next cable segment just by rotation before joining the cable segments together. U.S. 2012/0230629 to Lee describes varying the acoustic sensitivity along the cable path by modifying its layout and signal analysis by zones.

U.S. Pat. Nos. 7,304,725 and 7,595,865 to Hartog et al. describe using a pumped active fiber to optimize pulse power. U.S. Pat. No. 8,520,197 to Handerek describes using a double waveguide optical fiber to monitor two types of scattering using the same fiber, while commonly owned U.S. Pat. No. 7,769,252 to Taverner et al. describes a hybrid system using FBG spatial markers to increase spatial accuracy of distributed sensing systems based on backscattering. Finally, although fiber optic cavities have been multiplexed in the spectral and time domains for a couple of decades (as in commonly owned U.S. Pat. No. 5,987,197 to Kersey), the cavities have always been configured serially and consecutively.

SUMMARY

Certain aspects of the present disclosure provide methods to control and/or modify the acoustic properties of optical cables used for acoustic monitoring. These techniques are compatible with deployment of the cables in most oil and gas wells, including high pressure and temperature deep wells and stimulated extracted wells, including by hydraulic fracturation or steam stimulation.

Certain aspects of the present disclosure provide an optical cable. The optical cable generally includes a tube and an optical waveguide disposed in the tube and comprising a core and a cladding, wherein the core of the optical waveguide has varying angular positions along at least a first portion of the length of the optical cable with respect to an axis of the optical cable.

Certain aspects of the present disclosure provide a method of fabricating an optical cable. The method generally includes disposing an optical waveguide having a core and a cladding on a strip substrate and forming the strip substrate into a helix.

Certain aspects of the present disclosure provide a method of fabricating an optical cable. The method generally includes disposing an optical waveguide in a capillary, forming the capillary into a helix, and disposing the helix in a tube.

Certain aspects of the present disclosure provide a method for determining at least one of a direction or a speed of an acoustic wave. The method generally includes providing an optical cable comprising a tube and one or more optical waveguides disposed in the tube, each optical waveguide having one or more cores surrounded by a cladding, wherein the angular and radial positions of the one or more cores in the one or more optical waveguides are known at one or more locations along at least a portion of the length of the optical cable; measuring the times at which the acoustic wave stimulates the one or more cores in the one or more optical waveguides at one of the locations; and based on the measured times and on the known positions of the one or more cores in the one or more optical waveguides, determining the at least one of the direction or the speed of the acoustic wave at one of the locations.

Certain aspects of the present disclosure provide an optical cable. The optical cable generally includes a tube, an optical waveguide disposed in the tube, and one or more solid structures disposed between an inner surface of the tube and an outer surface of the optical waveguide and configured to form at least a portion of a solid path for acoustic waves to travel from an environment outside the tube to the optical waveguide.

Certain aspects of the present disclosure provide an optical cable. The optical cable generally includes a tube, a first acoustic sensor comprising a first optical waveguide disposed in the tube, and a second acoustic sensor comprising a second optical waveguide disposed in the tube, wherein the second acoustic sensor has different acoustic properties from the first acoustic sensor.

Certain aspects of the present disclosure provide a method of monitoring acoustics. The method generally includes providing an optical cable comprising a tube and a plurality of acoustic sensors disposed in the tube, wherein each acoustic sensor comprises an optical waveguide disposed in a channel containing soldering fluid; and selectively attaching at least one of the optical waveguides to at least a portion of the length of the tube by activating the soldering fluid in at least one of the channels having the at least one of the optical waveguides disposed therein.

BRIEF DESCRIPTION OF THE DRAWINGS

So that the manner in which the above-recited features of the present disclosure can be understood in detail, a more particular description, briefly summarized above, may be had by reference to various aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

To facilitate understanding, identical reference numerals have been used, where possible, to designate identical elements that are common to the figures. It is contemplated that elements disclosed in one aspect may be beneficially utilized in other aspects without specific recitation.

DETAILED DESCRIPTION

Certain aspects of the present disclosure provide methods to control and/or modify the acoustic properties of optical cables used for acoustic monitoring and compatible for deployment in oil and gas wells.

An Example Downhole Sensing System

Figure 1:
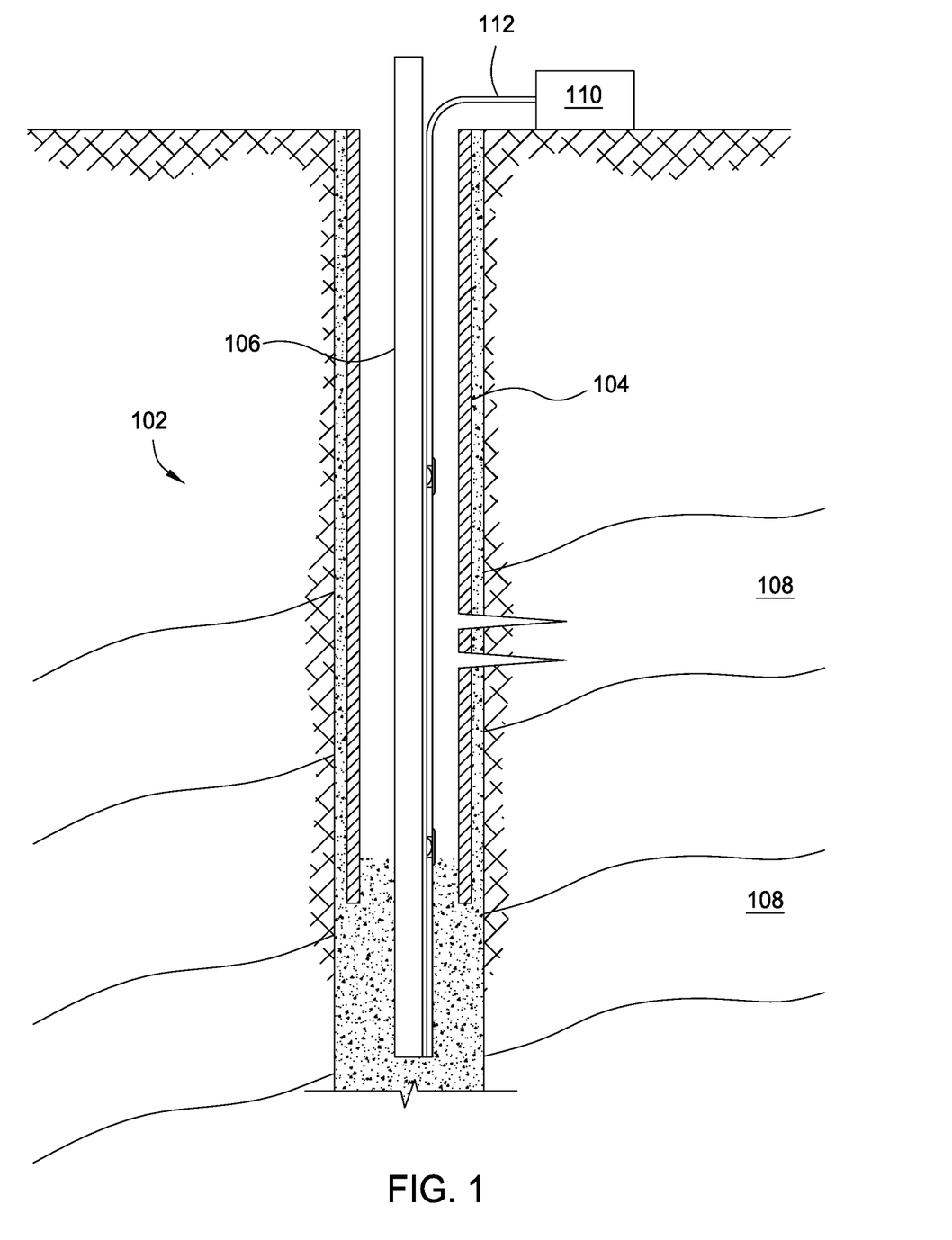
FIG. 1 is a schematic cross-sectional view of an example wellbore having a casing and production tubing with an optical cable for acoustic sensing deployed downhole and axially with respect to the casing and tubing, according to certain aspects of the present disclosure.

FIG. 1 is a schematic cross-sectional view illustrating an example acoustic sensing system for use downhole. The sensing system generally includes a wellbore 102, casing 104, production tubing 106, a sensing device 110, and an optical waveguide 112 (e.g., disposed in an optical cable). At least a portion of the system may be disposed adjacent one or more reservoirs 108 downhole.

The wellbore 102 may have casing 104 disposed within, through which production tubing 106 may be deployed as part of a wellbore completion. The sensing device 110 may be used to perform sensing and measurements related to the wellbore 102. Properties of the wellbore 102, a wellbore completion (e.g., casing, cement, production tubing, packers), and/or downhole formations and interstitial fluid properties surrounding or otherwise adjacent to the wellbore 102 may be monitored over time based on the sensing. Further, hydrocarbon production may be controlled, or reservoirs 108 may be managed, based on these monitored properties.

The optical waveguide 112, such as an optical fiber, may be disposed axially with respect to the casing 104 or the production tubing 106. One or more lengths of the optical waveguide 112 intended for acoustic sensing may have multiple Bragg gratings (e.g., fiber Bragg gratings (FBGs)) disposed therein. The Bragg gratings may be written directly or spliced into the optical waveguide 112, for example. The acoustic sensing system may perform acoustic sensing along the optical waveguide 112 at various sensing regions between the locations of the Bragg gratings.

The sensing system may employ a single optical waveguide or multiple waveguides in the same well and/or one or more different wells. For example, multiple waveguides may be utilized in different sections of a well, so that sensing may be performed in the different sections.

An acoustic energy source may generate and emit acoustic signals downhole. The acoustic signals may interact with the wellbore 102, the wellbore completion, and/or various downhole formations adjacent the wellbore, leading to transmitted, reflected, refracted, and/or absorbed acoustic signals. These acoustic signals may mechanically deform the optical waveguide 112 such that the optical propagation distance changes (e.g., the length of a waveguide section between Bragg gratings is perturbed by the force of acoustic pressure thereon).

The sensing system may include a sensing device 110 to introduce light (e.g., an optical pulse), using a pulsed laser, for example, into the optical waveguide 112. The light introduced by the sensing device 110 may be used to interrogate the Bragg gratings in the optical waveguide 112. The interrogation may be based on measurement of interference of two optical pulses at least partially reflected from the Bragg gratings. The interferometric approaches may include any suitable interrogation technique (e.g., using Mach Zehnder, Michaelson, Fabry Perot, ring resonators, polarimetric and two-mode fiber interferometers). For other aspects, the optical source may be separate from the sensing device 110. The sensing device 110 may include: (1) an optical-to-electrical converter (e.g., a photodiode) to convert the optical signals reflected from the Bragg gratings to electrical signals; and (2) one or more processing units for performing signal processing and analysis on the converted reflected signals. In this manner, the sensing system may be used to interferometrically measure any change in length, due to acoustic pressure, of a section of the optical waveguide 112 between Bragg gratings.

For other aspects, Rayleigh backscattering may be used along the optical waveguide 112, such that the optical waveguide may be used for distributed acoustic sensing (DAS), measuring disturbances in scattered light that may be propagated within the waveguide (e.g., within the core of an optical fiber). The disturbances in the scattered light may be due to the transmitted, reflected, and/or refracted acoustic signals, wherein these acoustic signals may change the index of refraction of the waveguide or mechanically deform the waveguide such that the optical propagation time or distance, respectively, changes. For some aspects, if the generated acoustic signals are measured at or near the acoustic source (or at some given point), as well as some distance away from the source, then the absorbed energy may also be understood and provide useful information.

The system may have a spatial resolution of one meter, for example, along the optical waveguide 112, depending on the pulse width of the source. Therefore, the optical waveguide 112 may be capable of producing the functional equivalent of tens, hundreds, or even thousands of acoustic sensors along the waveguide. The bandwidth of the signal that may be measured is typically within the acoustic range (i.e., 20 Hz to 20 kHz), but a DAS system may also be capable of sensing in the sub-acoustic (i.e., <20 Hz) and/or ultrasound (i.e., >20 kHz) ranges.

For some aspects, the sensing system may utilize an optical waveguide within a suspended cable deployed in the production tubing 106, in a cable disposed in an annulus between the production tubing 106 and the well casing 104

(e.g., coupled to the outside of the production tubing 106), or in a cable disposed in an annulus between the casing 104 and the walls of the borehole. The acoustic source may be generated from an active acoustic source deployed downhole or from a passive acoustic source.

Example Acoustically Enhanced Optical Cables

Certain aspects of the present disclosure provide techniques for designing and controlling acoustic properties of optical sensing probes, which may be applicable to a multitude of acoustic systems based on optical waveguides (e.g., optical fibers). Fiber optics may be used to sense a host of parameters intrinsically or through transducing coating structures that react to desired parameters by applying proportional stimuli on the optical sensor, typically via thermal or axial strain change.

Fiber optics may be used to measure vibration and acoustic front wave by measuring the dynamic variation of the minute axial strains these stimuli cause on the fiber. These minute local fiber length changes, on the order of nanometers, can be observed by phase shift of returned coherent optical signals from a constant location along the fiber. There are two main fiber optic acoustic technologies based on phase shift measurements: (1) semi-reflective cavities and (2) distributed acoustic sensing (DAS) based on Rayleigh backscattering of a coherent pulse launch. The semi-reflective cavities may be fabricated by placing two semi-transparent mirrors into the optical waveguide core (e.g., a fiber Bragg grating (FBG)) to create a defined waveguide segment with two ends from which coherent light can be reflected to measure their relative phase variations and, thus, the dynamic segment length changes. The DAS approach sends a pulse of coherent light along the optical waveguide and measures periodically at high frequency the phase of the light reflected by Rayleigh backscattering. Since the speed of light in the optical waveguide is known, the origin of a Rayleigh signal can be associated with a specific waveguide segment based on the flight time since the pulse's impulsion. Local phase shift is obtained by comparing the phase measurements from each waveguide segment in time.

Although optical fiber can be used for measuring vibrations and acoustic waves reaching it, in practice, the optical fiber may not be placed directly in the environment to be monitored. This is particularly true for oil and gas wells, in which the brittle optical fiber cannot mechanically survive if inserted directly in such a harsh environment. Thus, mechanical protective layers may be added to one or more optical fibers to form a fiber optic cable. Due to the high pressure, temperature, wearing, and corrosive properties of oil and gas wells on one hand, as well as their geometric aspect ratio of several kilometers long by centimeters in diameter, stainless steel or specialty alloy tubulars may be employed as suitable armoring for any type of in-well deployment. Consequently, acoustic monitoring of oil and gas wells and underground reservoirs is typically not done directly by such protected optical fibers since the acoustic waves must traverse the cabling layers that attenuate, distort, and axially disperse these waves, significantly affecting the monitoring system's performance.

Because fiber-optic-based systems for both acoustic and in-well monitoring are recent, most systems presently use standard fiber optic cables not designed for these particular applications. In-well acoustic monitoring has several potential applications for oil and gas extraction with each having specific and different acoustic performance specifications. These applications include the following, for example: downhole equipment health and functionality monitoring, operational strategy effectiveness monitoring, fluid and flow monitoring, and underground reservoir characterization and mapping.

Accordingly, what is needed are methods and designs to control acoustic properties of optical cables compatible with oil and gas wells environment.

Certain aspects of the present disclosure provide several methods and designs to control and adjust optical cables' acoustic properties to address the various in-well monitoring applications. In consequence, exhaustive description of the innovative approach and its aspects is unrealistic, so only a few examples of the suggested methods to control acoustic properties of the in-well optical cable are described herein to illustrate the main concepts.

Example Enhanced Acoustic Paths

Certain aspects of the present disclosure provide a method consisting of creating a path for a sound wave to reach an optical waveguide from the outside without having to travel into gaseous phases, which create more attenuation and dispersion. Several approaches may be used, from filling interstitial spaces between the optical waveguide and the cabling layers (and between individual cabling layers) with a fluid or gel compatible with the operating temperature (e.g., high temperature silicone), to more dedicated designs, such as using a large diameter optical waveguide with a thick cladding layer (e.g., 3 mm diameter, or at least 1 mm), coated with an appropriate material (e.g., high temperature silicone) overlapped by a mechanically protective braided metallic layer permeable to fluids in the well.

One aspect consists of filling voids and/or gas gaps between the outermost layer of the cable to the embedded optical waveguide to create a direct pathway to the waveguide for the acoustic wave reaching the cable. This can be accomplished by filling the interstices inside the cable with appropriate thermally stable fluids or gels, such as high temperature silicone. Contrary to the prior art, the filling material need not enable acoustic signal amplification by compression or other means and/or is not frequency specific; the filling material is utilized to provide a medium for the vibrations to propagate to the waveguide more directly than in air. Any of various suitable fluids may play this role, preferably fluids that ensure long-term stability at operational temperature. For example, oils similar to those found in the well would conform.

A particularly advantageous method involves (periodically) coupling (e.g., via soldering or bounding) the optical waveguide to a solid structure that is also in contact with the internal surface of the outside cabling layer, thus creating a direct solid path from the outside environment to the optical waveguide for the sound waves. For certain aspects, a solid part is soldered or otherwise mechanically coupled (e.g., fused or otherwise attached via glue or other adhesive) to both the optical waveguide and the inside of the outer armor layer of the cable, thus creating a solid path for the acoustic wave to propagate to the optical waveguide. This solid bridge need not be continuous since any axial strain perturbation along the unitary acoustic sensor can be perceived thereby. A periodical solid structure bridging the optical waveguide to the outer armor layer may be used, where this period may most likely be shorter or equal to the unitary acoustic sensor length. In addition to transmitting acoustic waves to the optical waveguide, such a periodic structure may be used for applying other measurable stimuli to the waveguide (e.g., static axial strain) and thus can be used as part of a transducing mechanism to measure other parameters.

These (periodic) solid structures may be designed: (1) to react proportionally to the outside cabling layer deformation caused by isobaric or static pressure, especially if the cable cross-sectional area is not circular or has axially modulated compression characteristics (e.g., by varying diameter or wall thickness); and (2) to affect proportionally the optical waveguide, and thus also enable static pressure monitoring. For example, a rhombic metallic structure (similar to that shown in FIG. 2)—in which the optical fiber passes in the central axis and the summits of the structure are pressed on the internal surfaces of the metallic capillary along the short axis of an oval section thereof—would axially strain the section of optical waveguide within the structure proportionally to the pressure outside that capillary while providing a permanent metallic path for the external sound waves to reach the enclosed optical waveguide. These periodic structures may also be designed to transduce stimuli other than pressure into axial strain, or other measurable variations, on the embedded optical fiber, especially if using clamp-on transducers deployed outside the cable armor through anchoring mechanisms. For example, a simple rigid structure expanding with temperature more than the cable and pushing apart two cantilever rigid arms passing through the outside armor at a fixed point would bring the fixation points closer to a pre-tensioned internal optical waveguide, and thereby amplify thermal sensitivity of the waveguide (by adding an axial strain component thereto).

Figure 2:
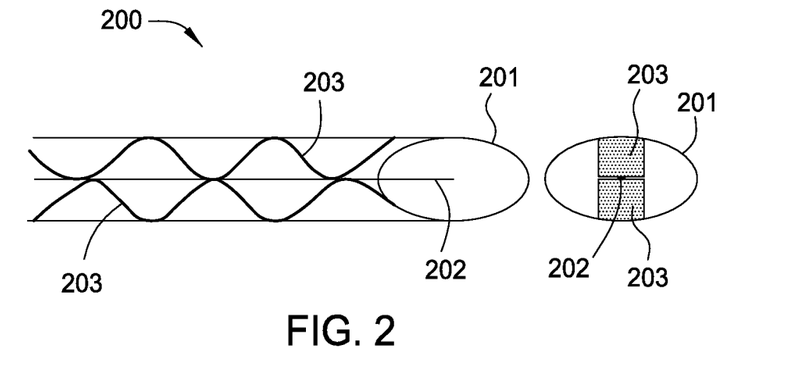
FIG. 2 illustrates an example periodic metallic path for a sound wave external to an optical cable to reach the optical waveguide, according to certain aspects of the present disclosure.

As an example of periodic solid structures, FIG. 2 illustrates an optical cable 200 that can measure acoustic signals and static pressure, in accordance with certain aspects of the present disclosure. The cable 200 is composed of an outer armor metallic layer 201 having an oval cross-section and containing an optical waveguide 202 (e.g., an optical fiber) having a core and a cladding. Two strips 203 composed of a suitable material (e.g., metal) may be periodically or intermittently bounded to the optical waveguide 202 to create two bent strips and form a repetitive eye-shaped configuration with the optical waveguide suspended at the center (of the cable and of the eye-shaped configuration). By properly selecting the periods ratio of metallic and waveguide bounds and the material dimensions and physical properties, the eye-shaped "amplitude" (i.e., the height of the peaks in the strips 203) may be designed to ensure permanent contact with the inside of the oval armor layer 201 along its small axis. Alternatively, the metallic strip may be bounded, soldered, or otherwise mechanically coupled to the armor layer 201 at the points of contact. With this configuration, the strips 203 play dual roles: (1) transferring acoustic signal to the optical waveguide 202 in the bounded regions; and (2) applying a static axial strain on the optical waveguide 202 between bounded regions proportionally to small axis compression of the armor layer 201 induced by the outside static pressure. Both optical waveguide strain profiles (static and dynamic) may then be measured to report acoustic waves and isobaric pressure surrounding the cable 200 by a combined coherent Rayleigh and Brillouin backscattering system, for example. Other optical methods of axial strain measurements may be used, such as Bragg grating acoustic cavities for dynamic strain and out-of-band Bragg gratings for static strain.

Another way these solid periodic bridges may be used to monitor additional parameters in addition to transmitting acoustic waves directly to the bounded waveguide is by extending their movement to the outside of the cable, so their movement can be activated by transducers outside the cable, and inducing a variation of the axial fiber strain between two bounded regions. One example illustration of this principle is a rigid bar traversing the outer armor layer of the cable where the bar is fixed in a hermetically sealed pivot point, the optical waveguide being bounded to the bar's internal end while the bar's external end is perpendicularly resting on the active part of the outside transducer. The outside transducer may be pushing apart or pulling together two consecutive solid bridge external extremities proportionally to the desired parameter, inducing an inverse effect on the axial strain on the waveguide between the corresponding internal extremities bounded to the waveguide. As the outside transducer pushes apart the bridge extremities, the bridge extremities may reduce the axial strain on the optical waveguide by coming closer inside the cable due to the pivot effect, and vice versa.

One example of such a transducer entails placing a metallic bar between the two solid bridges in an effort to relate outside temperature to axial fiber strain through the thermal expansion of the bar and the pivot effect. The outside transducer may most likely be positioned with respect to the cable to ensure adequate mechanical solidarity between the transducer's active element and the solid bridge and be secured in place. Alternatively, the outside transducer may be fixed (as part of another well's tooling, for example), and the cable may be properly positioned and fixed in place. Multiple transducers may be designed to relate various parameters to various proportional mechanical motions. Prolonging the movement of the periodic solid bridges to which the optical waveguide is attached through the outside armor layer may be achieved in any of various suitable ways.

Certain aspects of the present disclosure provide an optical cable that generally includes a tube, an optical waveguide disposed in the tube, and one or more solid structures disposed between an inner surface of the tube and an outer surface of the optical waveguide. The solid structures may be configured to form at least a portion of a solid path for acoustic waves to travel from an environment outside the tube to the optical waveguide.

According to certain aspects, the one or more solid structures contact the optical waveguide.

According to certain aspects, the one or more solid structures are attached to the inner surface of the tube at one or more locations along a length of the tube. For certain aspects, the one or more solid structures are attached to the inner surface of the tube via at least one of solder or an adhesive.

According to certain aspects, the one or more solid structures comprise a strip of material having a plurality of bends. The plurality of bends may be periodic for at least a portion of the strip. For certain aspects, the plurality of bends have a first periodicity for a first portion of the strip and a second periodicity for a second portion of the strip. The second periodicity may be the same as or different from the first periodicity. For certain aspects, a periodicity of the plurality of bends corresponds to a resolution of a distributed acoustic sensing system based on backscattering of light introduced into the optical waveguide.

According to certain aspects, the strip of material having the plurality of bends forms a spring capable of being compressed radially between the tube and the optical waveguide.

According to certain aspects, the tube has a non-circular cross-section. For certain aspects, the non-circular cross-section comprises an oval cross-section having a short axis and a long axis. In this case, the one or more solid structures may be disposed along the short axis of the oval cross-section.

According to certain aspects, the tube comprises a wall having varying thicknesses in at least one of: (1) a length of the optical cable or (2) a cross-section of the optical cable.

According to certain aspects, a cross-section of the tube comprises a first thickness of a wall between an outer diameter and an inner diameter of the tube that is different from a second thickness of the wall in the same cross-section of the tube.

According to certain aspects, the one or more solid structures include two solid structures disposed on opposite sides of the optical waveguide. In this case, the optical waveguide may be positioned by the two solid structures to follow a central axis of the tube.

According to certain aspects, the optical cable may further include one or more transducers mechanically coupled to an outer surface of the tube.

Example Enhanced Acoustic Directionality

Acoustic waves are vectorial entities, and thus, the direction of their propagation is also of interest. Certain aspects of the present disclosure provide directionality (in addition to the axial direction) in the optical cable path. This may be accomplished by having the core of the optical waveguide at various known positions offset from the cable central axis. One approach involves embedding in the cable a multicore optical waveguide for which relative radial positions of the multiple cores are known. By monitoring the chronological sequence at which the sound wave is stimulating each of the individual cores, the vectorial speed (i.e., the velocity) of the acoustic front may be determined. This can also be achieved by using several single core optical waveguides deployed in a known position relative to one another and to the well.

For certain aspects, obtaining directionality of acoustic wave propagation may be performed by using cables containing radially off-centered optical waveguides—but located at known (angular and radial) positions according to their longitudinal location—and monitoring their relative response delays. One can then represent the unitary acoustic sensor as elements of a three-dimensional (3-D) sonar array and use standard algorithms to deduce acoustic wave propagation directionality and speed based on the relative delays between the unitary responses. The angular and radial positions of the waveguides may be obtained either by controlling the waveguide positions during the cable fabrication and installation into the well or by "cable shape monitoring." When installing a circular cable, it is difficult to control the cable's angular orientation, but using a noncircular cable (especially a cable with at least one flat or matching side) can ensure keeping a desired orientation during cable insertion into the well. For example, the cable may be strapped on the well's casing with its flat side resting axially along the outer diameter of the casing. This way, the cable's exact position and orientation in the well is known. Similarly, during cable fabrication the exact angular and radial positions of the optical waveguide cores within the cable may either be controlled or characterized against the longitudinal position and reference "flat" side (forming a D-shaped cross-section). If the profile of local axial fiber strain is monitored, "cable shape" algorithms that calculate local deformations based on observed local strains to reconstruct the cable three-dimensional path may also be used to obtain axial and radial positions of the cores according to their longitudinal position.

For certain aspects, directionality of acoustic wave propagation may be created by using an optical waveguide with a spiral core or to deploy the optical waveguide helicoidally around the cable central axis. These helices need not be perfect; rather, these helices may be designed to form a path with known angular and radial locations according to the longitudinal position in the cable or armor layer. Several methods may be used to achieve this, including the following, for example: (1) wrapping and fixing the optical waveguide around an internal axial support, cylindrical or not; (2) placing the waveguide into a small capillary that is then coiled into a spring shape and covered by a tubular layer against which the capillary presses; and (3) fixing the optical waveguide to a rectangular or strip substrate that can be deployed helicoidally into the cable armor to press onto the armor's inside wall (in fact, if the substrate is a metallic strip, the substrate can be helicoidally welded to directly form a cable's armor layer). Coordinating the waveguide core may be accomplished by controlling the orientation during the cable assembly and deployment. Another way involves associating local axial strain measurements along the optical waveguide on these helicoidal deployments, using cable shape algorithms to determine the exact waveguide's core path (similar to those described in U.S. Pat. No. 6,256,090 to Chen et al.), and then associating the sensors' spatial locations according to the sensors' longitudinal positions along the waveguide path.

Figure 3:
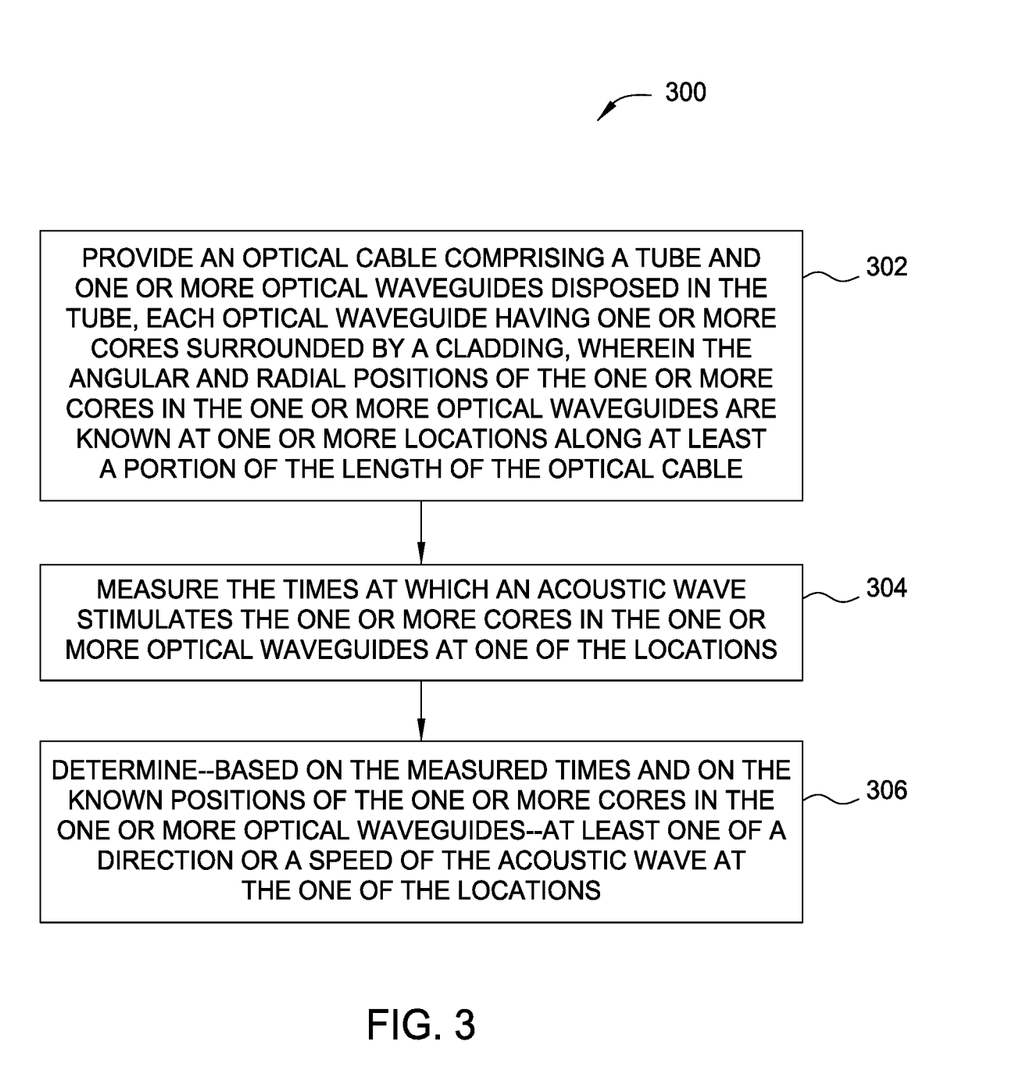
FIG. 3 is a flow diagram of example operations for determining at least one of a direction or a speed of an acoustic wave, according to certain aspects of the present disclosure.

FIG. 3 is a flow diagram of example operations 300 for determining at least one of a direction or a speed of an acoustic wave (e.g., a velocity vector), according to certain aspects of the present disclosure. The operations 300 may begin, at block 302, by providing an optical cable. The optical cable generally includes a tube and one or more optical waveguides disposed in the tube, each optical waveguide having one or more cores surrounded by a cladding. The angular and radial positions of the one or more cores in the one or more optical waveguides are known at one or more locations along at least a portion of the length of the optical cable. For certain aspects, the angular and radial positions of the one or more cores in the one or more optical waveguides are known relative to one another of the one or more cores at the one or more locations.

At block 304, the times at which the acoustic wave stimulates the one or more cores in the one or more optical waveguides at one of the locations may be measured. Based on the measured times and on the known positions of the one or more cores in the one or more optical waveguides, the at least one of the direction or the speed of the acoustic wave at the one of the locations may be determined at block 306.

According to certain aspects, the one or more optical waveguides include a first optical waveguide having a first core surrounded by a first cladding and a second optical waveguide having a second core surrounded by a second cladding. In this case, the angular and radial positions of the first core and of the second core may be known at the one or more locations. For certain aspects, the measuring at block 304 may involve measuring a first time at which the acoustic wave stimulates the first core at the one of the locations and measuring a second time at which the acoustic wave stimulates the second core at the one of the locations. The second time is different from the first time.

According to other aspects, the one or more optical waveguides include an optical waveguide having a core, where the optical waveguide is disposed helicoidally in the tube. The angular and radial positions of the core of the optical waveguide may be known at the one or more locations. In this case, the measuring at block 304 may entail measuring a first time at which the acoustic wave stimulates a first part of the core at the one of the locations and measuring a second time at which the acoustic wave stimulates a second part of the core at the one of the locations. For certain aspects, the first and second parts of the core are disposed in a single coil (i.e., a single spiral) of the helicoidally disposed optical waveguide at the one of the locations.

As presented above, there are several ways to off-center the optical waveguide core into varying angular and radial positions along the length of the cable. The optical waveguide itself may contain multiple cores at various angular and radial locations or a helicoidal core around the waveguide's central longitudinal axis. Although a helix maintains a constant radial position, its varying angular position is sufficient to create a delay between two different points on a helical loop receiving acoustic signals with a delay larger than the acquisition time, such that the two points can be distinguished. Conventionally, helicoidal fiber deployments were used to wrap the fiber around amplification devices swelling and contracting in response to acoustic waves and thus straining more or less the wrapped fiber, similarly to geophone designs. The helicoidal approach may also be applied at the optical fiber or capillary levels. The optical fiber can be wrapped (and fixed or not) around a central circular (or other shaped) member inside the outer armor layer.

Figure 4:
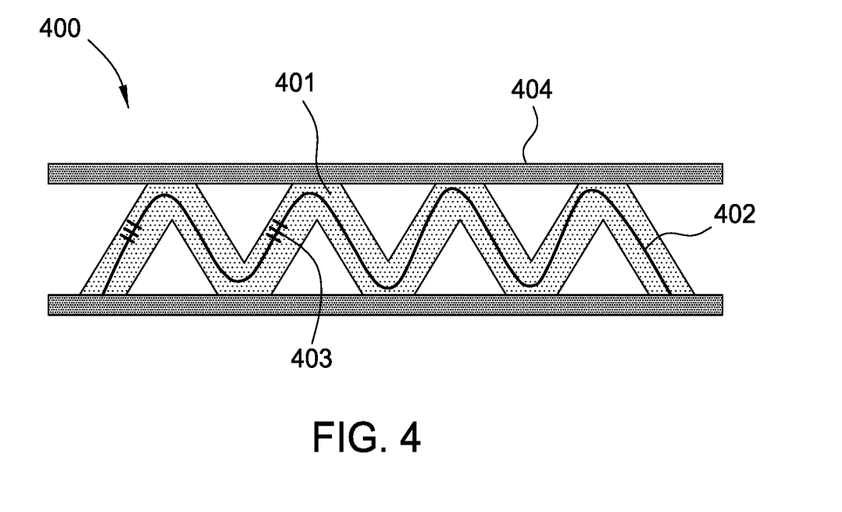
FIG. 4 illustrates an example optical cable with a helicoidal optical waveguide core configuration, according to certain aspects of the present disclosure.

FIG. 4 presents an example at the capillary level in an optical cable 400, in which an optical fiber 402 is pre-inserted into a capillary 401, which is then coiled into a spiral to form a spring-like shape (e.g., a helix). Then, the coiled capillary 401 may be inserted into an outer armor layer 404, or the armor layer may be formed (e.g., rolled and seam welded) around the coiled capillary 401. In FIG. 4, the spring force of the coiled capillary 401 pushes the capillary against the internal surface of the armor layer 404 to maintain the capillary in place. For other aspects, portions of the coiled capillary 401 may be mechanically coupled to the internal surface of the armor layer 404 (e.g., via an adhesive) to maintain the position of the capillary. Optionally, local strain sensors, such as FBG 403, may be fabricated along the optical fiber 402, such that "cable shape" algorithms may be used to obtain 3-D mapping of the acoustic sensing elements in the well.

Figure 5:
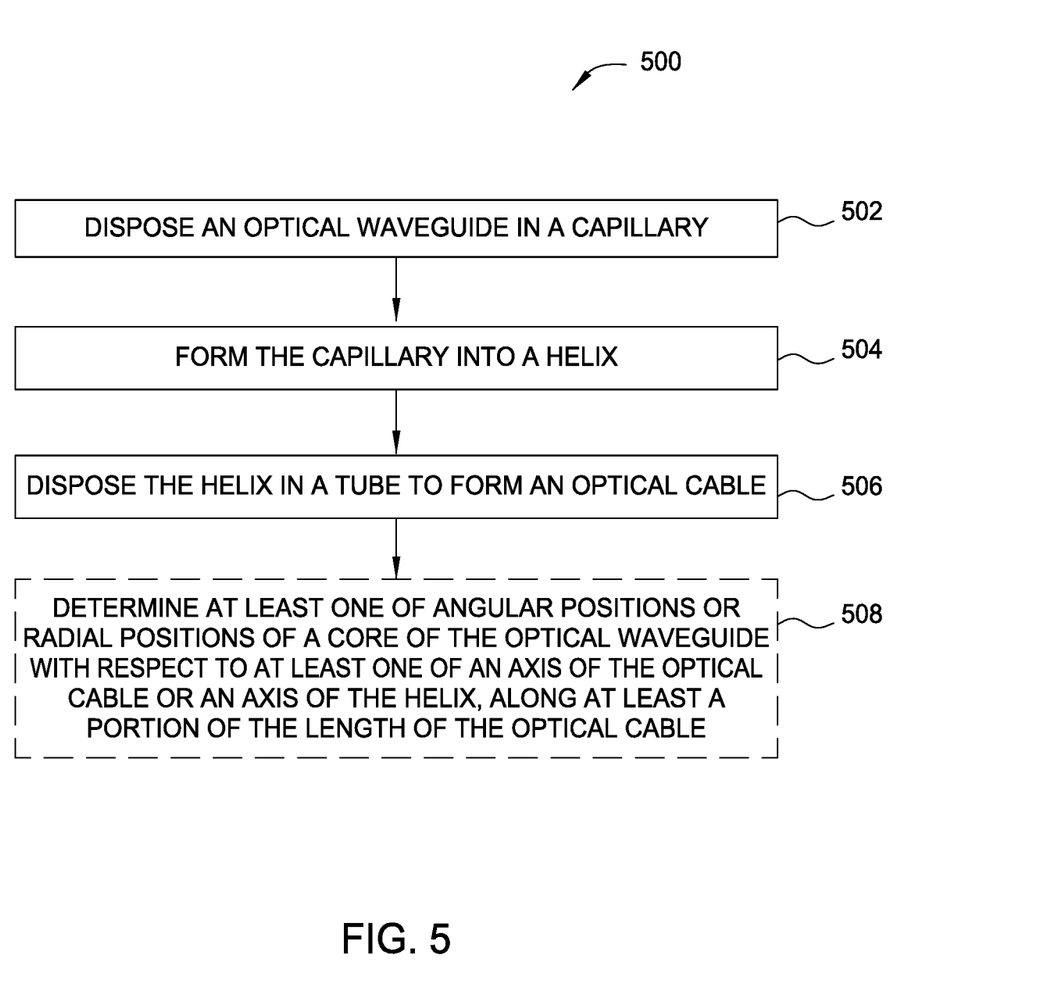
FIG. 5 is a flow diagram of example operations for fabricating an optical cable with a helical capillary, according to certain aspects of the present disclosure.

FIG. 5 is a flow diagram of example operations 500 for fabricating an optical cable with a helical capillary, according to certain aspects of the present disclosure. The operations may begin, at block 502, by disposing an optical waveguide in a capillary. For certain aspects, disposing the optical waveguide in the capillary involves inserting the optical waveguide into the capillary.

At block 504, the capillary may be formed into a helix. For certain aspects, forming the capillary into the helix involves wrapping the capillary around a mandrel to form the helix and removing the mandrel from the helix. In this manner, the mandrel is not disposed in the finished optical cable after fabrication.

At block 506, the helix may be disposed in a tube. For certain aspects, disposing the helix in the tube involves inserting the helix into the tube. For other aspects, disposing the helix in the tube entails forming the tube around the helix.

According to certain aspects, the operations 500 may further include attaching portions of the helix to an inner surface of the tube. This may include using any of various suitable materials, such as adhesive, solder, and the like.

According to certain aspects, the operations 500 may further entail adding Bragg gratings to a core of the optical waveguide and determining, using the Bragg gratings, at least one of angular positions or radial positions of the core of the optical waveguide with respect to at least one of an axis of the optical cable or an axis of the helix, along at least a portion of the length of the optical cable.

Another similar approach involves disposing an optical waveguide (e.g., an optical fiber) onto a long strip that can then be deployed helicoidally into the cable. This can be accomplished in several ways, such as bounding, pushing against inside walls by spring forces, or wrapping around a support member (e.g., a mandrel). For some aspects, if the long strip is metallic, edges of the strip itself may be welded helicoidally to form the outside armor layer.

Figure 6:
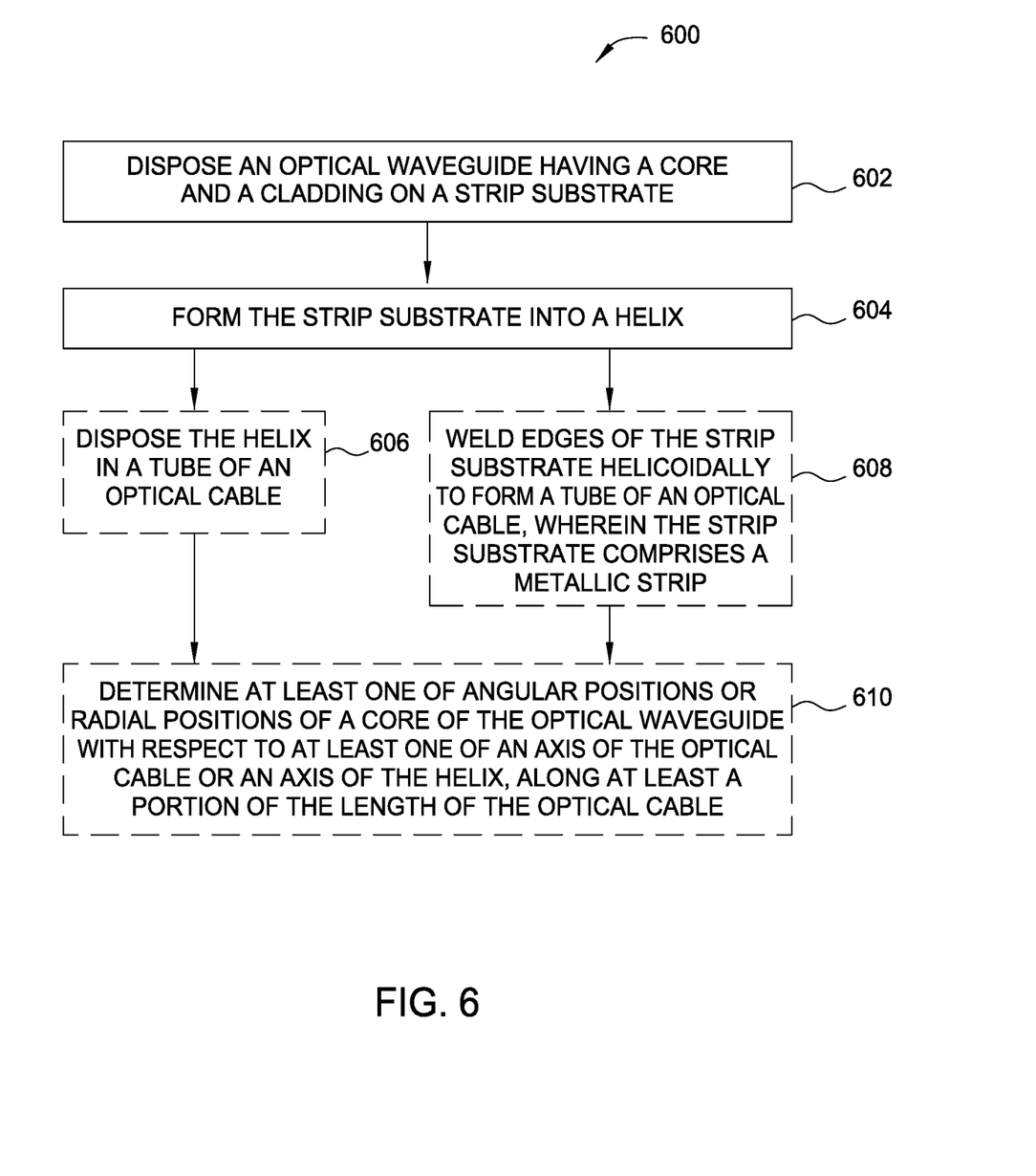
FIG. 6 is a flow diagram of example operations for fabricating an optical cable using a strip substrate, according to certain aspects of the present disclosure.

FIG. 6 is a flow diagram of example operations 600 for fabricating an optical cable using a strip substrate, according to certain aspects of the present disclosure. The operations 600 may begin, at 602, by disposing an optical waveguide having a core and a cladding on the strip substrate. For certain aspects, the disposing at block 602 may entail attaching the optical waveguide to the strip substrate with an adhesive. At block 604, the strip substrate may be formed into a helix.

According to certain aspects, the operations 600 further include disposing the helix in a tube of the optical cable. For certain aspects, the optical waveguide is located on an inner surface of the helix in the tube. For other aspects, the optical waveguide is located on an outer surface of the helix in the tube.

According to certain aspects, the operations 600 further involve welding edges of the strip substrate helicoidally to form a tube of the optical cable. In this case, the strip substrate may be a metallic strip.

According to certain aspects, the operations 600 may further entail adding Bragg gratings to the core of the optical waveguide and determining, using the Bragg gratings, at least one of angular positions or radial positions of the core of the optical waveguide with respect to at least one of an axis of the optical cable or an axis of the helix, along at least a portion of the length of the optical cable.

Example Enhanced Spatial Resolution

Another advantage of a helicoidally deployed optical waveguide as described above is increased effective optical waveguide length per cable length, thereby increasing the spatial resolution and the acoustic sensitivity of the cable, which is proportional to the length of waveguide exposed to the acoustic stimuli. In other words, the helicoidal configuration enables putting a longer length of fiber per length of armor or cable, thereby increasing the cable's sensitivity and spatial resolution, which are proportional to fiber length. Another aspect of the present disclosure involves increasing ultimate spatial resolution by using additional wavelengths to interrogate the optical waveguide. More specifically, another way of increasing spatial resolution for reflective-cavity-based systems (e.g., those utilizing Bragg gratings) is to use multiple interrogation wavelengths and to spatially interleave their spectrally specific serial cavities interrogated in time division; or, for systems not based on inscribed reflective cavities, to use multiple interrogation wavelengths launched with a delay inferior to the detector sampling time.

Figure 7:
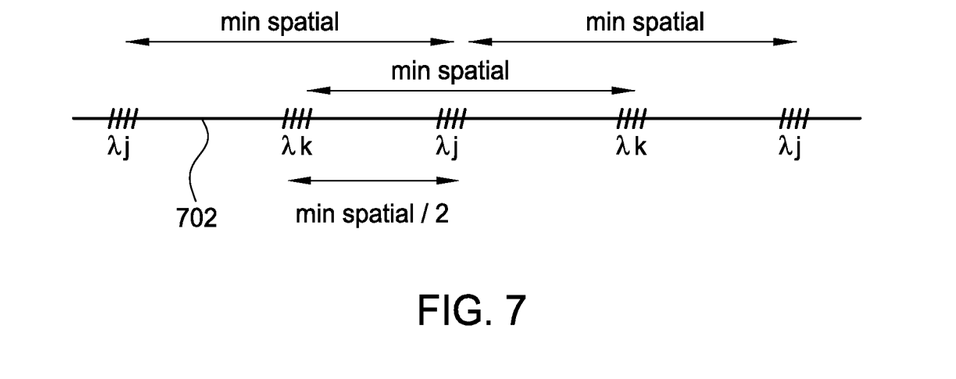
FIG. 7 illustrates interleaved time division multiplexed and wavelength division multiplexed (TDM/WDM) acoustic semi-reflective cavities along an optical waveguide, according to certain aspects of the present disclosure.

FIG. 7 illustrates using an additional wavelength with a semi-reflective acoustic-cavities-based system in an effort to increase spatial resolution. The system interrogates successive cavities (e.g., Bragg gratings) using a first wavelength ($\lambda_j$), where the distance between cavities responsive to the first wavelength ($\lambda_j$) should be longer than the distance traveled by light during the minimal signal acquisition time, thus limiting the spatial resolution. A second pulse at a different wavelength (λk) may be introduced into the optical waveguide 702 with corresponding cavities (e.g., λk-responsive cavities) placed between (e.g., in the middle of) the λj-responsive cavities. The optical signals returned may be separated according to their wavelengths and sent to two separate acquisition units, for example, and two interleaved responses can be obtained, which once processed logically in binary form double the ultimate spatial resolution.

Similarly for a distributed backscattering-based system, if an additional pulse is sent at a different wavelength, the two pulses' respective responses can be separated and sent to two signal acquisition units. By synchronizing the two pulses with different wavelengths by a delay corresponding to half the minimal acquisition time and simultaneous synchronized acquisitions, the effective consecutive sensor segments for the two wavelengths may be interleaved exactly in the middle of one another, thereby doubling the ultimate spatial resolution. Interleaving acoustic cavities may cause some nonlinear interactions, which may be compensated for via signal processing algorithms.

Example Cable with Varied Acoustic Properties

Certain aspects of the present disclosure involve varying the acoustic properties of the cable to enhance certain regions and/or decouple effects. One example method includes placing multiple fiber-optic probes with various acoustic properties embedded into a single cable armor. Another example method utilizes "incomplete" assembly to allow subsequent cable sectional acoustic properties assignation. For example, un-welded periodic metallic transducers may be placed inside the cable, but selected transducers may be activated at the well-site (e.g., by ultrasonic welding through the armor). Also, a hybrid system composed of more sensitive acoustic cavities defined by two semi-reflective structures may be used to enhance and calibrate a DAS system based on coherent Rayleigh scattering or other distributed means. Elements may also be fabricated inside the optical waveguide to locally modify its acoustic properties, such as inscribing birefringent or tilted FBGs or placing a pumped active cavity emitting light modulated by the acoustic waves perturbing it or pumped active fiber to enhance sensor signals.

As introduced above, one example method for introducing varying acoustic properties includes embedding multiple acoustic probes (including optical waveguides and/or capillaries) with different acoustic characteristics into the same armor layer of the cable. For example, one of the acoustic probes embedded together may be designed to be very sensitive to very low frequencies for seismic monitoring, while another probe may be designed to react to high frequencies (e.g., to monitor crack formation and propagation). As another example, one of the acoustic probes embedded together may be more sensitive to a certain frequency range for pump health monitoring, while another probe may be specialized for a different frequency range associated with fluid turbulences to establish flow profiles. In this manner, not only can the global acoustic cable monitor pump health and flow profiles simultaneously, but such a cable can also differentiate pump sounds from flow sounds in the global acoustic waves received by their different gains in the two specific probes' responses. This can be very useful, especially when a loud sound (i.e., a high amplitude acoustic signal) is present and tends to drown out all other sounds.

This decoupling of effects by using multiple probes with different gains for these effects may be used to extract and/or correct various artifacts, including, but not limited to, large intensity ratio, cross-talk, thermal noise, optical fiber polarization, cabling frequency distortion, and axial dispersion. One variation of this that increases accuracies is a hybrid system using both coherent Rayleigh scattering and semi-reflective cavities on the same optical waveguide. Not only is this hybrid system capable of precisely locating DAS spatial channels against the optical waveguide inscribed cavities, but such a system can also obtain differential gains exactly on the same locations.

Also as introduced above, another example variation involves partially assembling or completing the acoustic cable in advance and finalizing the assembly on-site before, during, or after the insertion of the cable into the well. This enables the assigning of specific acoustic properties to segments of the cable in an effort to (exactly) line up with other well's tooling and to match the specific well's properties only known after the results of carrots analysis (analysis of earth core samples), usually obtained a few hours before the start of the well completion. Several methods can be used to achieve this on-site assignation, such as attaching a transducer onto the cable as described above. Locally energizing the cable to initiate internal curing or bonding between pre-aligned elements is another way of modifying acoustic properties locally in or on the cable.

Figure 8:
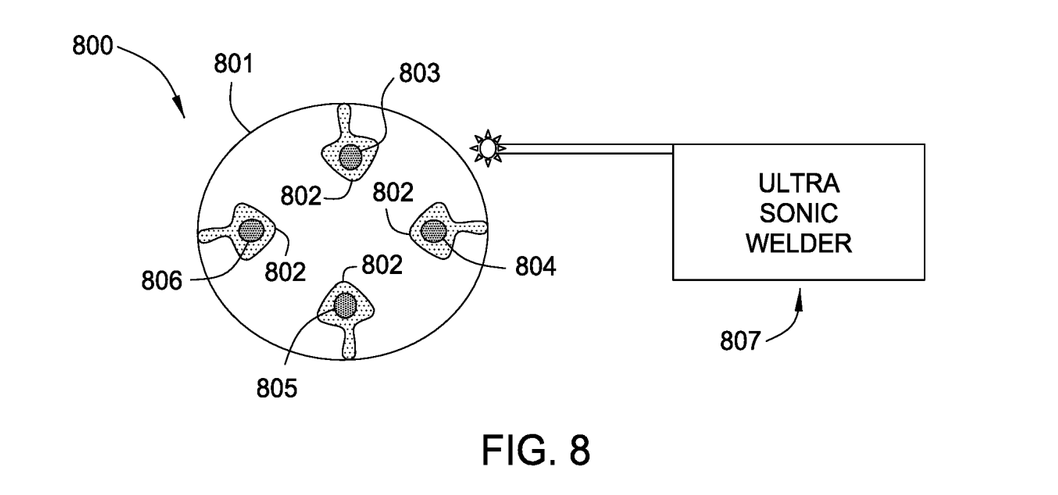
FIG. 8 is an illustration of a non-uniform acoustic optical cable, according to certain aspects of the present disclosure.

FIG. 8 illustrates an example of this concept. The semi-assembled cable 800 is composed of four internal channels 802, which may be filled with an ultrasonic soldering fluid and contain one of four fiber optic capillaries 803, 804, 805, 806 with different acoustic properties, one per channel 802. Although four channels 802 are shown as an example, an optical cable may include more or less than four channels. Using an ultrasonic welder 807 on site, an operator can decide to weld any combination or none of the four capillaries 803-806 to the armor layer 801, in an effort to enhance the acoustic wave propagation to the specific capillary, at any location along the cable length. In this manner, acoustic properties of the cable 800 may be modified locally at the cable insertion site.

Another variation involves inscribing into the fiber elements to locally vary a fiber element's acoustic properties. For example, inscribing a highly birefringent FBG creates polarization axis differentiation sensitive to pressure, and thus to dynamic pressure or acoustic waves. Tilted FBGs are also sensitive to pressure, temperature, bending, and strain, which can be all measured independently and simultaneously. Pumped active optical fibers will emit different spectral distribution as these fibers are submitted to acoustic waves or vibrations, amplified if the fibers contain an FBG and even more if this FBG contains a phase shift creating a sub-micrometer acoustic cavity.

Figure 9:
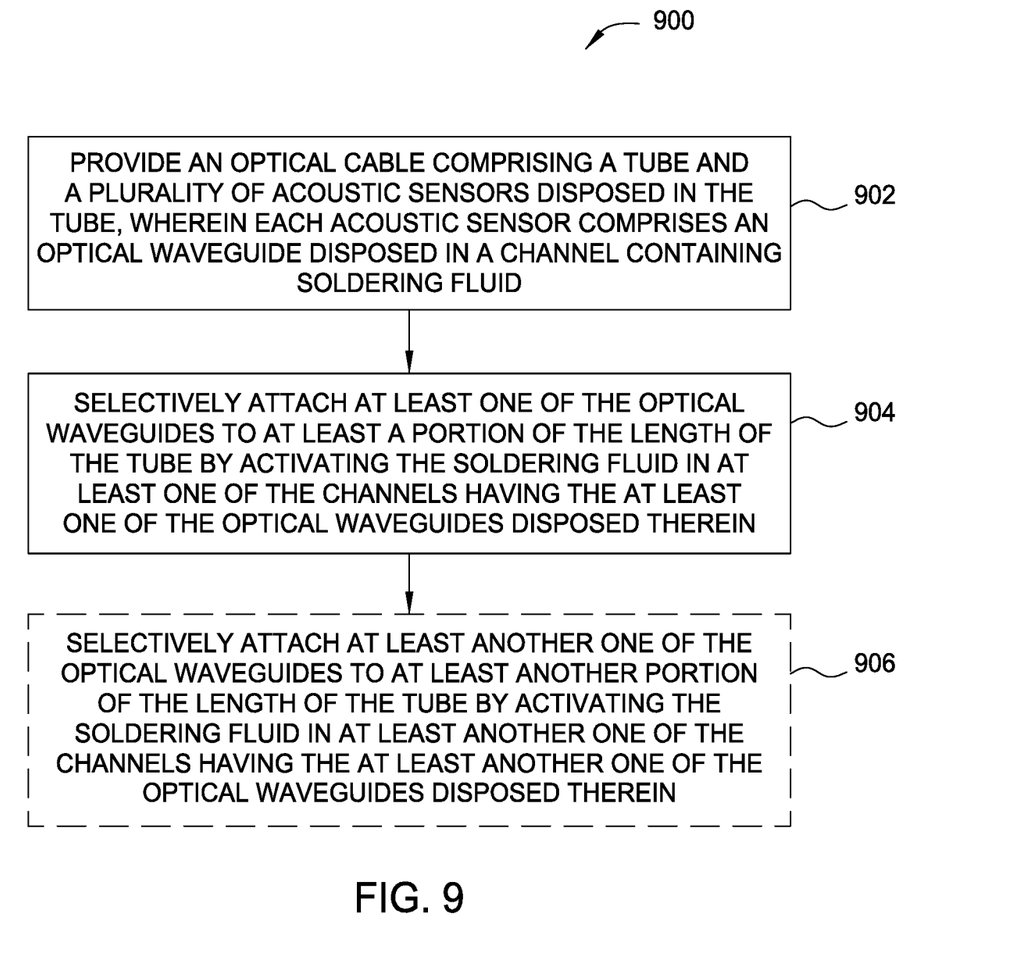
FIG. 9 is a flow diagram of example operations for customizing an optical cable for monitoring acoustics, according to certain aspects of the present disclosure.

FIG. 9 is a flow diagram of example operations 900 for customizing an optical cable for monitoring acoustics, according to certain aspects of the present disclosure. The operations 900 may begin, at block 902, by providing an optical cable (e.g., semi-assembled cable 800). The optical cable may include a tube (e.g., armor layer 801) and a plurality of acoustic sensors disposed in the tube. Each acoustic sensor may include an optical waveguide disposed in a channel (e.g., channels 802) containing soldering fluid.

At block 904, at least one of the optical waveguides may be selectively attached to at least a portion of the length of the tube by activating the soldering fluid in at least one of the channels having the at least one of the optical waveguides disposed therein. For certain aspects, at least one of the acoustic sensors has acoustic properties different from at least another one of the acoustic sensors (e.g., different frequency ranges as described above). For certain aspects, activating the soldering fluid at block 904 involves applying an ultrasonic welder (e.g., welder 807) along the portion of the length of the tube.

According to certain aspects, the operations 900 may optionally further entail selectively attaching at least another one of the optical waveguides (or the same at least one of the waveguides) to at least another portion of the length of the tube by activating the soldering fluid in at least another one of the channels having the at least another one of the optical waveguides disposed therein.

Certain aspects of the present disclosure provide an optical cable that generally includes a tube, a first acoustic sensor comprising a first optical waveguide disposed in the tube, and a second acoustic sensor comprising a second optical waveguide disposed in the tube. The second acoustic sensor has different acoustic properties from the first acoustic sensor.

According to certain aspects, the first acoustic sensor further includes a first capillary, the first optical waveguide is disposed in the first capillary, the second acoustic sensor further includes a second capillary, and the second optical waveguide is disposed in the second capillary.

According to certain aspects, the different acoustic properties are due to the second capillary having different acoustic characteristics from the first capillary.

According to certain aspects, the first acoustic sensor is disposed in a first channel, the second acoustic sensor is disposed in a second channel, and at least one of the first channel or the second channel is disposed adjacent an inner surface of the tube. For certain aspects, at least one of the first channel or the second channel contains ultrasonic soldering fluid.

According to certain aspects, the different acoustic properties include different frequency ranges, such that the first acoustic sensor has a different frequency range from the second acoustic sensor.

Any of the operations or algorithms described above may be included as instructions in a computer-readable medium for execution by the sensing device 110 or any suitable processing system. The computer-readable medium may comprise any suitable memory or other storage device for storing instructions, such as read-only memory (ROM), random access memory (RAM), flash memory, an electrically erasable programmable ROM (EEPROM), a compact disc ROM (CD-ROM), or a floppy disk.

CONCLUSION

These aspects, and variations thereof, are different approaches to control the acoustic properties of optical cables compatible with oil and gas environments. These approaches can be used separately or in any combination to increase the acoustic performance of an acoustic probe that constitutes an in-well optical cable, rather than relying on legacy fiber optic cable designed to simply transmit optical signals, thereby significantly increasing the performance of a global monitoring system. As an example of combining various aspects, an optical fiber may be wrapped helicoidally around a hollow metallic thin capillary inserted in an oval armor layer with a high temperature silicone gel in the interstice between the capillary and the armor layer, and the optical fiber may contain out-of-band tilted FBGs to reconstruct cable shape and measure capillary axial compressions proportional to outside pressure.

Certain aspects of the present disclosure provide methods of controlling acoustic properties of optical cables inserted into oil and gas wells. Some aspects of the present disclosure provide a sound path for acoustic waves from the outer armor layer to the optical waveguide without voids or gas cells (e.g., using fluids to fill interstices, including gels; using high temperature silicone; using oils; using solids, including solidification once in place; and using polymerizing, including locally along the cable length at the well site). Some aspects of the present disclosure provide (periodic) solid structures bridging an optical waveguide to an outer armor layer of the cable to transmit acoustic waves. These bridges may be used as transducers to measure other parameters, including by axial strain on the waveguide (axial strain monitoring by Brillouin scattering and/or using out-of-band FBGs). Some aspects may involve protracting these (periodic) bridge transducers to anchoring fixtures outside the outer armor layer to be activated by other transducers placed outside of the cable (e.g., rendering more solid fiber optic attachments of solid structure to outside movement of anchoring fixtures; using clamp-on outside transducers, including adding these transducers during cable insertion into the well; using outside transducers fixed to other well completion tools and aligning and fixing the cable thereto, including at well-site during cable insertion). Some aspects of the present disclosure involve measuring hydrostatic pressure outside the cable, including with a non-circular cabling section (e.g., through fluid/gel compression or through solid (periodic) bridge used as transducer).

Some aspects of the present disclosure entail using an off-axially centered waveguide core (with radial and/or angular longitudinal variations) to determine directionality and/or speed of acoustic wave propagation. This may include, for example, using 3D spatial locations of the individual sensors and their relative delays in responding to calculate directionality and/or speed of acoustic wave propagation; using cable fabrication and installation methods to control the 3D spatial path of waveguide cores (e.g., using a non-circular cable to have an angular reference, including a flat surface and/or a matching surface to a well's feature on which the cable rests); using local strain sensor array and "cable shape" algorithms to calculate the 3D spatial paths of waveguide cores; using a multi-core waveguide and/or multiple waveguides with at least one core radially off-centered; using local strain sensor array and "cable shape" algorithms to calculate the 3D spatial paths of waveguide cores; or using a helicoidal deployment of the waveguide core. This helical deployment of the waveguide core may include, for example, an optical waveguide with a helicoidal core; a waveguide and/or a capillary wrapped around a support, that could be removed and not present in the cable, cylindrical or otherwise; a capillary coiled to from a spring-like shape, including with the spring force pushing the capillary against the inside surface of the outer armor layer to form a contact; or using a ribbon substrate coupled to the waveguide, which may be deployed either by bounding the substrate and/or using mechanical forces exerted by the substrate to fix the substrate in place in the cable, including helicoidally welding a metallic substrate to form the outer armor layer with the waveguide fixed to the substrate's internal surface.

Some aspects of the present disclosure may involve reducing ultimate spatial channel length or increasing spatial resolution by adding additional pulses at different wavelengths. For example, this may involve launching an additional wavelength pulse with a delay inferior to the acquisition rate for backscattering measurements or inscribing interleaving cavities at different wavelengths for a semi-reflective acoustic-cavities-based system.

Certain aspects of the present disclosure may involve varying acoustic properties of the cable along its length. This may be performed, for example, by using multiple probes (e.g., capillaries and/or fibers) with different acoustic properties inside the same cable to select variable acoustic properties along the cable and/or decouple effects and parameters; by using a semi-reflective acoustic-cavities-based system and a coherent Rayleigh backscattering system for simultaneous acoustic monitoring, including using a single optical waveguide for both; by modifying/assigning local longitudinal acoustic properties of the cable after fabrication (e.g., including: (i) applying and fixing an external transducer to the cable, including transducing through anchoring points mechanically coupled via a solid path to the embedded optical waveguide, such as: (1) applying clamp-on transducers on the cable; or (2) fixing the cable on transducers embedded in other elements of the well completion, including pumps and/or valves; (ii) modifying a cable's internal sound transmission medium properties, including by polymerization, solidification, and/or degradation (breaking chemical bounds); (iii) modifying a cable's internal structure by initiating components bounding, including by polymerization and/or welding; or (iv) modifying a cable at a well-site during insertion); or by using structures inscribed into the waveguide and/or variation of longitudinal core composition to modify locally the acoustic response properties (e.g., including: (i) using a segment of pumped active fiber emitting light spectrally influenced by acoustic waves, including containing FBG phase shifted or not; or using highly birefringent FBG, tilted FBG, and/or regular FBG).

While the foregoing is directed to aspects of the present disclosure, other and further aspects of the present disclosure may be devised without departing from the basic scope thereof, and the scope thereof is determined by the claims that follow.

The invention claimed is:

1. An optical cable comprising:
a tube; and
an optical waveguide disposed in the tube and comprising a core and a cladding, wherein the core of the optical waveguide has varying angular positions along at least a first portion of the length of the optical cable with respect to an axis of the optical cable, wherein the varying angular positions are known.

2. The optical cable of claim 1, wherein the core is disposed helicoidally in the cladding of the optical waveguide.

3. The optical cable of claim 1, wherein the core of the optical waveguide has the varying angular positions and varying radial positions along the at least the first portion of the length of the optical cable with respect to the axis of the optical cable.

4. The optical cable of claim 1, wherein the optical waveguide is disposed helicoidally around the axis of the optical cable.

5. The optical cable of claim 4, wherein the optical waveguide is disposed in a capillary and wherein the capillary is disposed helicoidally around the axis of the optical cable.

6. The optical cable of claim 5, wherein portions of the capillary are attached to an inner surface of the tube.

7. The optical cable of claim 1, wherein the core of the optical waveguide comprises one or more Bragg gratings.

8. The optical cable of claim 1, wherein the optical waveguide is disposed on a strip formed into a helix.

9. The optical cable of claim 8, wherein the strip comprises a metallic strip welded helicoidally to form the tube.

10. The optical cable of claim 1, further comprising another optical waveguide disposed in the tube and having a core and a cladding, wherein:
the core of the other optical waveguide has at least one of varying angular positions or varying radial positions along at least a second portion of the length of the optical cable with respect to an axis of the optical cable; and
the at least the second portion of the length of the optical cable is different from the at least the first portion.

11. A method of fabricating an optical cable, comprising:
disposing an optical waveguide having a core and a cladding on a strip substrate;
forming the strip substrate into a helix;
adding Bragg gratings to the core of the optical waveguide; and
determining, using the Bragg gratings, at least one of angular positions or radial positions of the core of the optical waveguide with respect to at least one of an axis of the optical cable or an axis of the helix, along at least a portion of the length of the optical cable.

12. The method of claim 11, further comprising disposing the helix in a tube of the optical cable.

13. The method of claim 12, wherein the optical waveguide is located on an inner surface of the helix in the tube.

14. The method of claim 11, further comprising welding edges of the strip substrate helicoidally to form a tube of the optical cable, wherein the strip substrate comprises a metallic strip.

15. The method of claim 11, wherein the disposing comprises attaching the optical waveguide to the strip substrate with an adhesive.

16. A method of fabricating an optical cable, comprising:
disposing an optical waveguide in a capillary;
forming the capillary into a helix; and
disposing the helix in a tube, wherein disposing the helix in the tube comprises forming the tube around the helix.

17. The method of claim 16, further comprising attaching portions of the helix to an inner surface of the tube.

* * * * *